(No Model.) 2 Sheets—Sheet 1.

V. BELISLE.
HOSE COUPLING.

No. 423,853. Patented Mar. 18, 1890.

Witnesses

Victor Belisle Inventor

By his Attorneys
Smith & Denison (No Model.) 2 Sheets—Sheet 2.

V. BELISLE.
HOSE COUPLING.

No. 423,853. Patented Mar. 18, 1890.

Witnesses
H. P. Denison
Frank D. Enney

Victor Belisle  Inventor
By his Attorneys
Smith & Denison

UNITED STATES PATENT OFFICE.

VICTOR BELISLE, OF OSWEGO, ASSIGNOR TO THE CONSOLIDATED CAR HEATING COMPANY, OF ALBANY, NEW YORK.

HOSE-COUPLING.

SPECIFICATION forming part of Letters Patent No. 423,853, dated March 18, 1890.

Application filed April 1, 1889. Serial No. 305,509. (No model.)

*To all whom it may concern:*

Be it known that I, VICTOR BELISLE, of Oswego, county of Oswego, in the State of New York, a citizen of the United States, have invented certain new and useful Improvements in Hose-Couplings, of which the following is a specification, reference being had to the accompanying drawings, in which—

Figure 1:
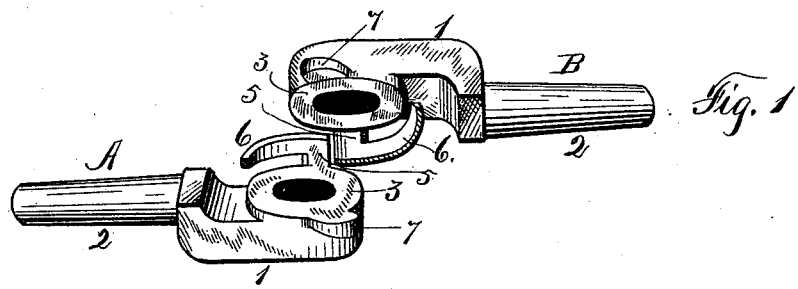
Figure 2:
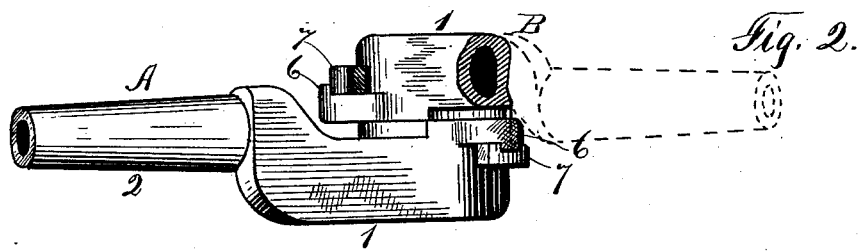
Figure 3:
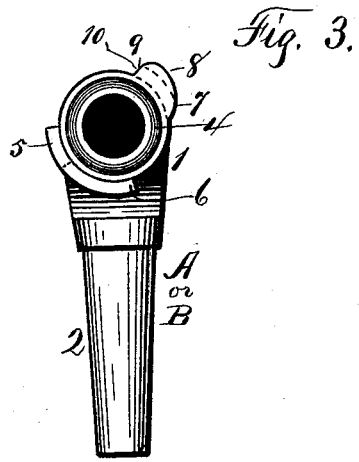
Figure 4:
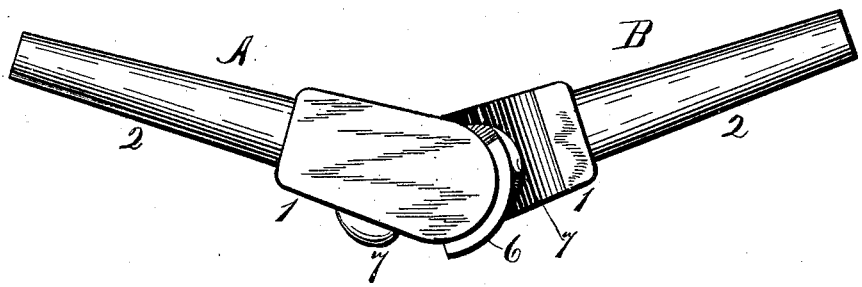

Figure 1 is an elevation of the parts detached and ready to be placed together for coupling. Fig. 2 is a top plan of the parts to be coupled together. Fig. 3 is a plan view of one section detached. Fig. 4 is a side elevation of the parts coupled together, as in Fig. 2.

This invention relates to the construction of hose-couplings, whether used for steam, air, hot air, water, or gas, which are coupled together on the "wedge-fast" principle, and which are uncoupled by simply drawing the sections of the coupling into a straight line with each other, allowing them to fall apart of themselves.

The object of my invention is to produce a coupling which of its own gravity will wedge the sections of the coupling together when the coupling is in a pendent position, the parts wedging themselves together and creating a tight joint and automatically taking up the wear, and producing thereby a very durable and easily operated coupling of simple construction.

My invention consists in the several novel features of construction and operation hereinafter described and which are specifically set forth in the claim annexed.

It is constructed as follows: A is one section of the coupling and B the other, and as these sections are counterparts of each other, and are not "rights and lefts," I will proceed to describe the construction of one section only. Each section consists of a body 1 and a stem 2, the stem being tapered and adapted to permit the hose to be secured thereon. The stem and body are hollow and the body stands at an offset of substantially one-half, so that when the coupling-sections are locked together they stand as to their stems in substantially a straight line. The bore of each section is straight through the stem and at the base of the stem deflects to correspond with the offset of the body, and then turning a right angle opens out through the face 3 of each section. This face is carefully faced up and smooth and may also be provided with a packing-ring 4, set into a groove in the face in any ordinary manner. Each face constitutes one-half of the seat of the coupling and when placed together constitute a joint. Upon each coupling-section, at substantially the points shown in the drawings and nearly opposite each other, are the means for locking the sections together, which comprise on one side a stem 5, from the top of which projects an arm 6, the inner face of which is concentric with the face 3, and the outer face of which is narrow at the point and enlarges or thickens back toward the stem 5 from the point, so as to give it somewhat the appearance of a curved wedge. On the opposite side of the face 3 from the stem 5 is the locking-lug 7, the inner face of which is substantially flush with the face 3, and the outer face of which is cut away so as to form a lip 8, and between this lip and the body 1 is a groove 9, the lip forming one side thereof and the body the other, and the bottom of this groove is wedged from the front edge thereof 10 back toward the other end of the lug. The lug 7 and the stem 5 are usually cast integral with the body 1 and stem 2, and these parts—the stem, the body, the stem or post 5, the arm 6, and the lug 7—constitute a section of the coupling in conjunction with the packing-ring in the face when such a ring is used. When the faces are placed together, each lug 7 slips under the arm 6 of the other section, and each lug engages with an arm, and the inclined faces of the arms, engaging with the inclined faces of the lugs, wedge and draw against each other, crowding the faces 3 tightly against each other, and the lips 8 operate in conjunction with the arms 6 to guide the sections in their relations to each other, so that the openings through the faces 3 come directly opposite and in line with each other. This coupling is desired to hang in the position shown in Fig. 4, and the gravity of the sections will wedge them together sufficiently to create a tight joint between them.

When, for illustration, such a coupling is used between railway-cars to convey gas or steam or hot air from one car to another, so long as the cars are coupled together and the coupling is pendent between the cars it will remain tightly closed; but when the cars are uncoupled and separate such separation will draw upon the coupling and will release the wedges from each other just before the parts assume a straight line with each other, and then the coupling-sections will fall apart, such uncoupling being automatic entirely. To couple them together I place them substantially in a straight line with each other, with the faces 3 together and the point of the arms 6 engaging with the lug 7 on the other coupling-section, and let them drop, and then by their own gravity and automatically they couple themselves together, as hereinbefore described.

What I claim is—

A hose-coupling consisting of two sections, counterparts of each other, each provided with a stud projecting outward from one side of the body contiguous to the face thereof, and an arm projecting angularly from the stud along the body and diverging therefrom, and each section provided also with a wedging and outwardly-projecting lug opposite the arm and adjacent to the face of the section, each lug fitting through the tapering slot between the arm and body upon the other section and having a lip on its outer end engaging with the outer edge of the arm on the other section.

In witness whereof I have hereunto set my hand this 25th day of March, 1889.

VICTOR BELISLE.

In presence of—
H. P. DENNISON,
C. W. SMITH.